United States Patent [19]

Gambini et al.

[11] Patent Number: 5,370,807
[45] Date of Patent: Dec. 6, 1994

[54] BORON-CONTAINING ADDITIVE FOR LUBRICATING OILS, AND PROCESS FOR PREPARING SAID ADDITIVE

[75] Inventors: Paola Gambini, Milan; Paolo Koch, Melegnano, both of Italy

[73] Assignee: Ministero Dell'Universita E Della Ricerca Scientifica E Tecnologica, Rome, Italy

[21] Appl. No.: 59,211

[22] Filed: May 10, 1993

[30] Foreign Application Priority Data

May 15, 1992 [IT] Italy .......................... MI92 A 001155

[51] Int. Cl.$^5$ .......................................... C10M 155/04
[52] U.S. Cl. ................................... 252/49.6; 526/239; 558/291
[58] Field of Search ...................... 252/49.6; 558/291; 526/239

[56] References Cited

U.S. PATENT DOCUMENTS

| | | | |
|---|---|---|---|
| 2,994,713 | 8/1961 | Lane . | |
| 3,076,013 | 1/1963 | Liao et al. | 252/49.6 |
| 3,087,936 | 4/1963 | LeSuer | 252/49.6 |
| 3,113,106 | 12/1963 | Klass et al. | 252/49.6 |
| 3,304,260 | 2/1967 | Fields et al. . | |

FOREIGN PATENT DOCUMENTS 618691 of 1949 United Kingdom .

Primary Examiner—Jacqueline V. Howard
Attorney, Agent, or Firm—Oblon, Spivak, McClelland, Maier, & Neustadt

[57] ABSTRACT

Viscosity index improver and friction modifier additive constituted by a boron-containing poly-(alkyl)-acrylate, process for preparing said additive and use of said additive in the formulation of lubricating oils.

9 Claims, No Drawings

BORON-CONTAINING ADDITIVE FOR LUBRICATING OILS, AND PROCESS FOR PREPARING SAID ADDITIVE

The present invention relates to an additive for lubricating oils, which additive is capable of improving the viscosity index and of modifying the friction behaviour of said lubricating oil.

In the technical sector relevant to lubricating oils, adding an oil-soluble polymer capable of modifying the rheological behaviour of said oils with varying temperatures ("viscosity index improver—V.I.I.), such as, e.g., a polymer or copolymer of an alkyl ester of (meth)acrylic acid, containing in its alkyl group such a number of carbon atoms, as to render its oil-soluble, is known.

Also the benefits obtainable by means of the introduction, into said oil-soluble polymer, of a copolymerizable, nitrogen-containing monomer, in order to endow the resulting product with dispersant properties, besides the properties relevant to the improvement in viscosity index, are known in the art.

Said copolymerizable, nitrogen-containing monomer, also designated "dispersant monomer" is generally selected from among vinyl-imidazoles, vinyl-pyrrolidones, vinyl-pyridines and N,N-dialkylaminoethyl methacrylates.

Furthermore, V.I.I. copolymers with dispersant and antioxidant action are known as well, which can be used in lubricant formulations for internal combustion engines, with the purpose of decreasing the formation of sludges and reducing the oxidation of the lubricating oil during engine operation.

For example, U.S. Pat. No. 4,699,723 discloses ethylene-propylene copolymers onto which monomers containing one nitrogen atom and one sulfur atom (such as, e.g., 4-methyl-5-vinyl-thiazole) are grafted. The resulting grafted copolymers, besides improving the viscosity index, display an activity as dispersants and antioxidants.

As far as the present Applicants are aware of, from the prior art no viscosity index improver additives are known, which are also capable of modifying the trend of friction coefficient—in a given system—with varying operating conditions, i.e., which are also "friction modifier" additives.

The so-said "friction modifiers" usually are long-chain molecules having the necessary polarity to endow them with characteristics of affinity for the metal surfaces. In fact, said additives act by forming thin layers on the surfaces undergoing friction. From the view point of effectiveness, alcohols are worse than esters, and the latter are worse than acids.

The "friction modifiers" are largely used in "ATF fluids", i.e., fluids for use in automatic transmissions, high-performance gear oils, lubricants for guides and saddles of machine tools and oils for oil-bath brakes and clutches.

The present invention relates to additives for lubricating oils, which additives are capable of improving the viscosity index, and of modifying the trend of friction coefficient, i.e., substances simultaneously displaying viscosity index improver and friction modifier properties.

In accordance therewith, a first aspect of the present invention relates to a polymeric additive simultaneously displaying properties of viscosity index improver and of friction modifier, having the general formula (I):

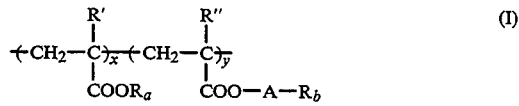

deriving from the copolymerization of unsaturated esters, with said general formula (I) showing the type and amount of reactive monomers, but not their arrangement in the end polymeric chain, in which, in said formula x and y have the meaning of relative amount;
R' and R'' are the same, or different from each other, and are hydrogen atoms or $(C_1-C_3)$-alkyl radicals;
A is either $-CH_2CH_2-$ or $-CH(CH_3)CH_2-$;
$R_a$ is a linear or branched alkyl radical or a mixture of linear or branched alkyl radicals of from 8 to 30 carbon atoms;
$R_b$ is a radical having the general formula (II):

wherein:
R is a difunctional alkenyl radical with general formula (III)

wherein:
"n" is an integer and can be either zero or 1;
$R^1-R^6$ which are the same, or different from one another, are H or $(C_1-C_3)$-alkyl radicals, with the proviso that at least two from the four radicals $R^1$, $R^4$, $R^3$, $R^6$ are $(C_1-C_3)$-alkyl radicals.

In the preferred form of practical embodiment, x is comprised within the range of from 80 to 98% by weight, y is comprised within the range of from 2 to 20% by weight, R' and R'' are hydrogen or methyl, and $-A-$ is $-CH_2CH_2-$.

According to a still more preferred form of practical embodiment, n is 1 and $R^1$, $R^4$ and $R^3$ are methyl groups.

The first step for preparing the additive with general formula (I) consists in preparing the $H-R_b$ 

compound, i.e., the compound with general formula (IV)

A possible synthesis route in order to produce said compound with general formula (IV) consists in the reaction of esterification of boric acid with an aliphatic diol containing hydroxy groups in 1,2- or 1,3-positions.

By operating with a molar ratio of diol:acid of approximately 1, cyclic diesters of boric acid with general formula (IV) are obtained.

The reaction should advantageously be carried out in an inert solvent and under such temperature conditions, that water will be removed as it is formed, preferably at temperatures comprised within the range of from about 80° to 130° C.

As an alternative route, (IV) can be obtained by means of the reaction of transesterification of dialkyl borates, still with the above said diols.

By operating in said ways, a reaction mixture is obtained which contains, although in much smaller amounts than (IV), monoesters, diesters and triesters of boric acid. However, the raw reaction mixture does not require any further purification steps, and can be directly submitted to copolymerization.

When the compound with general formula (IV) is ready, the polymerizable monomer contained in the copolymer with general formula (I) in the percent amount as specified by "y" can be advantageously prepared by means of the esterification of (alkyl)—hydroxyethyl or —hydroxypropyl acrylate with the compound with general formula (IV).

In this case too, the reaction will be carried out in an inert solvent, and under such temperature conditions, that water will be removed as it is formed, preferably at temperatures comprised within the range of from about 80° to 130° C.

The copolymer with general formula (I) is then prepared by means of the usual copolymerization of (alkyl)acrylate monomers, preferably in the presence of an inert diluent-solvent.

According to a still more preferred form of practical embodiment, the inert solvent is the same mineral oil, which is used as the base oil for formulating the end lubricant.

In order to carry out the polymerization, the monomers are outgassed, either separately or together, then are mixed and diluted with the inert organic solvent, preferably mineral oil, such as, e.g., Solvent Neutral 5.4 cSt at 100° C.

The reaction mixture is then heated, in the absence of oxygen, at a temperature comprised within the range of from 70° to 130° C., in the presence of a free-radical initiator, which may be added either before or after the heating step, until a conversion of the (alkyl)acrylic esters to the corresponding copolymer is reached, which is comprised within the range of from 60 to 100%.

Free-radical catalysts suitable for the intended purpose are generally selected from among tert.-butyl peroctanoate, tert.-butul perbenzoate, azo-bis-isobutyronitrile, dibenzoyl peroxide, di-lauroyl peroxide and bis-(4-tert.-butyl-cyclohexyl) peroxidicarbonate and are used in an amount comprised within the range of from 0.2 to 3 parts by weight per each 100 parts of (alkyl)acrylic esters.

Optionally, the reaction mixture may also contain sulfur-containing substances, such as aliphatic mercaptans, thioglycols and thiophenols (such as, e.g., tert.-dodecyl mercaptan and ethane-dithiol), performing the function of regulating the molecular weight of the copolymer.

In general, such sulfur-containing substances perform their activity in amounts of from 0.01 to 0.5 parts by weight per each 100 parts by weight of (alkyl)acrylic esters.

The progressing of the reaction can be monitored by IR analysis. The conversion of monomers reaches the pre-established value within a time period which generally is comprised within the range of from 0.5 to 4 hours, for such temperature values and such operating conditions as specified hereinabove.

In that way, a solution of the polymeric additive with general formula (I) in an inert solvent is obtained.

The copolymer can possibly be isolated as such, by removing the solvent according to per se known techniques, e.g., under reduced pressure.

The polymeric additive with general formula (I) can be added as such to the lubricating oil, or, preferably, such an addition can be facilitated by using a concentrate containing from 25% to 95% by weight, preferably from 40 to 70%, of the additive dissolved in a solvent-diluent, which, according to a preferred aspect of the present invention, can be the same mineral oil which is used as the inert solvent for preparing the additive with general formula (I).

A further aspect of the present invention is a lubricating oil composition containing a major proportion of lubricating oil, and an effective amount as V.I.I. and friction modifier, of the additive disclosed hereinabove.

Such an effective amount, as referred to pristine polymer, is generally comprised within the range of from 0.5 to 10%, preferably from 1.2 to 6%, by weight.

The additive according to the present invention is suitable for use in ready-to-use lubricants in combination with such other usual additives as dispersants, detergents, anti-wear, antioxidant agents, and so forth.

The following examples are reported in order to allow the present invention to be better understood.

EXAMPLE 1

Synthesis of (Ia)

2-hydroxy-4,4,6-trimethyl-1,3,2-dioxaborinane 61.2 g of boric acid (1 mol) and 118.2 g of 2-methyl-2,4-pentanediol (1 mol) and 200 ml of heptane are charged to a reaction flask equipped with stirrer, Marcusson apparatus and reflux condenser. The reaction mixture is heated up to its reflux temperature (about 95° C.), with stirring, and is kept at that temperature for a 4-hour period.

After collecting 17.5 ml of water (theoretical value=18 ml), the solvent is removed by rotary evaporator. A viscous fluid is thusly obtained; said viscous fluid is collected with pentane, and the white solid which precipitates is filtered off. Yield 92%.

Elemental analysis:

Experimental (theoretical) values: C: 50.07 (50.0); H: 9.02 (9.03); B: 7.36 (7.60).

Melting point: 80° C.

EXAMPLE 2

Synthesis of (Ib)

1-hydroxy-4-propyl-5-ethyl-1,2,3-dioxaborinane 61.2 g of boric acid (1 mol) and 146.2 g of 2-ethyl-1,3-hexanediol (1 mol) are charged to a reaction flask equipped with Marcusson apparatus and containing 300 ml of heptane. The reaction mixture is heated up to its reflux temperature (about 95° C.), with stirring, and is kept at that temperature for a 4-hour period; 17.3 ml of water is collected (theoretical value=18 ml).

The reaction is then quenched and the solvent is removed by rotary evaporator. A viscous fluid is thusly obtained, which is collected with pentane. A white solid product precipitates and is filtered off. Yield 91%.

Elemental analysis:

Experimental (theoretical) values: C: 56.85 (56.15); H: 10.00 (9.4); B: 6.40 (6.43).

EXAMPLE 3

Synthesis of (IIa)

1-(methacryloylethoxy)-4,4,6-trimethyl-dioxaborinane 72 g of dioxaborinane (Ia) (0.5 mol) and 65 g of hydroxyethyl methacrylate (0.5 mol) are charged to a flask containing 200 ml of n-heptane.

The reaction mixture is heated up to the solvent reflux temperature and then is kept with stirring for a 4-hour period, during which 7.9 ml of $H_2O$ is collected (theroretical value=9 ml).

The reaction is quenched and the raw reaction mixture is cooled, the solid matter contained in it is filtered off and the solvent is then evaporated from the filtrate, by rotary evaporator; a colourless liquid is obtained (yield 88%), which is constituted by methacryloylethoxy dioxaborinane (IIa).

Elemental analysis:

Experimental (theoretical) values: B: 4.0 (4.3).

EXAMPLE 4

Preparation of copolymers containing (IIa) units 146.5 g of SN150 oil, 15.8 g of boron-containing (IIa) methacrylate and 137.7 g of linear-($C_{12}$-$C_{18}$)-alcohol methacrylate monomers are charged to a reactor thermostatted at the temperature of 40° C.

The reaction mixture is outgassed with stirring, and under a flowing nitrogen stream, for 1 hour; the reaction mixture is then heated up to the temperature of 95° C. and when that temperature is stabilized, 1.94 g of tert.-butyl peroctanoate polymerization catalyst is rapidly added.

The reaction hexotherm is controlled by means of the reactor temperature control means and the reaction temperature is kept at 95° C.

The reaction is allowed to proceed under such conditions for a 3-hour period, with the reaction progressing being monitored through I.R., by checking the disappearance of the signals generated by the monomers.

300 g is obtained of a clear liquid (PB), soluble in mineral base oils, which is constituted by a solution of polymer (I) at 50% by weight.

The following Table 1 reports the rheological characteristics of the resulting polymethacrylate borate (PB).

TABLE 1

| Bulk viscosity | $KV_{100°\,C.}$: | 691 cSt |
|---|---|---|
| Viscosity at 10% in SN150 | $KV_{100°\,C.}$: | 12.21 cSt |
| | $KV_{40°\,C.}$: | 64.50 cSt |
| | V.I.: | 190 |
| | $KV_{-15°\,C.}$: | 2,666 cSt |
| Viscosity at 10% in SN150 after mechanical depolymerization | $KV_{100°\,C.}$: | 10.78 cSt |
| Pour point in solution at 10% in SN150 | Temp.: | −36 °C. |

These data indicate the possibility that the borate polymers according to the present invention can be used as viscosity index improver additives.

Besides the rheological behaviour, the borate polymer according to the present invention was also evaluated by means of the hydrolytic stability test according to ASTM D 2169.

A solution at 1% by weight in SN150, and, for comparison purposes, a solution containing an analogous polymer (($C_{12}$-$C_{18}$ alcohol polymethacrylate), not containing borate functions—designated with code HV33—were prepared.

The results of the test are reported in Table 2.

TABLE 2

| | Oil TAN* | | Water TAN | | |
|---|---|---|---|---|---|
| Code | Before test | After test | Theroretical value | Found value | Copper corrosion |
| 1% PB | 0.01 | 0.0 | 25.7 | 1.4 | 2a |
| 1% HV33 | 0.01 | 0.0 | — | 1.4 | 2a |

*TAN = Total Acidity Number

The theoretical value reported for PB is calculated assuming that all boron in additive molecules is hydrolyzed into boric acid and released to the aqueous solution; the TAN values are expressed as mg of KOH per gram.

From Table 2, one can see that the borate polymer gives water an acidity analogous to the boron-free compound; this leads to the conclusion that the introduction of such a function does not alter the hydrolytic stability of such a polymer.

Still compared to HV33, the borate polymer was evaluated by means of the tribological tests, the results of which are reported in Table 3.

A first investigation is carried out with the SRV tribometer, an instrument designed to study friction and wear caused by vibrations, under the following conditions:

| *Amplitude of oscillations (mm) | 1 |
|---|---|
| *Frequency of oscillations (Hz) | 50 |
| *Applied load (N) | 200 |
| *Temperature (°C.) | 50 |
| *Time (minutes) | 120 |
| *Repeatability (friction coefficient) | 0.005 |

A second investigation is carried out with LFW-1 tribometer according to ASTM D 2714-68, under the following conditions:

| *Revolution speed (rpm) | 72 |
|---|---|
| *Sliding speed (meters/second) | 0.13 |
| *Applied load (daN) | 68 |
| *Hertz pressure (daN/$mm^2$) | 40 |
| *Temperature (°C.) | 44 |
| *Revolutions performed (number) | 5,000 |
| *Repeatability (wear track width) | 0.7 |

TABLE 3

| | L.F.W.-1 | | S.R.V. | |
|---|---|---|---|---|
| Code | Wear (mm) | Friction coefficient | Wear (mm) | Friction coefficient |
| SN450 | 1.12 | 0.044 | seizure | seizure |
| 4% PB | 1.37 | 0.030 | 0.39 | 0.080 |
| 4% HV33 | 1.52 | 0.036 | seizure | seizure |

From Table 3, the better behaviour of borate polymer on SRV test, which is known to be a very selective test, can be observed.

The date expounded hereinabove clearly demonstrate the possibility of using PB as a friction modifier.

We claim:

1. A polymeric additive simultaneously displaying properties of viscosity index improver and friction modifier, having a general formula (I):

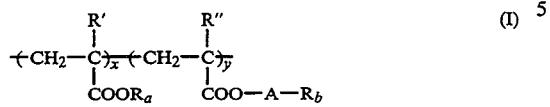

wherein said general formula (I) shows the type and amount of monomers, but not their arrangement in the end polymeric chain,
wherein
- x and y have the meaning of relative amount, x is from 80 to 98% by weight and y is from 2 to 20% by weight;
- R' and R" are the same or different, and are hydrogen or ($C_1$-$C_3$)-alkyl radicals;
- A is either —$CH_2CH_2$— or —$CH(CH_3)CH_2$—;
- $R_a$ is a linear or branched alkyl radical or a mixture of linear or branched alkyl radicals of from 8 to 30 carbon atoms;
- $R_b$ is a radical having the general formula (II):

wherein
R is a difunctional alkylene radical with general formula (III)

wherein
- n is either 0 or 1; and
- $R^1$-$R^6$ are the same or different, and are hydrogen or ($C_1$-$C_3$)-alkyl radicals, and wherein at least two of the four radicals $R^1$, $R^3$, $R^4$ and $R^6$ are ($C_1$-$C_3$)-alkyl radicals.

2. A polymeric additive according to claim 1, wherein R' and R" are hydrogen or methyl, and A is —$CH_2CH_2$—.

3. Polymeric additive according to claim 1, in which n is 1 and $R^1$, $R^4$ and $R^3$ are methyl groups.

4. A concentrate for lubricating oils, comprising:
(a) a dilutent; and
(b) 25-95% by weight of an additive with a general formula (I)

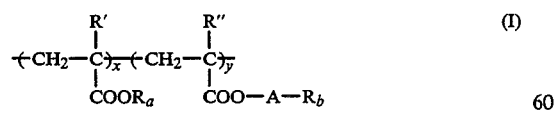

wherein said general formula (I) shows the type and amount of monomers, but not their arrangement in the end polymeric chain,
wherein
- x and y have the meaning of relative amount, x is from 80 to 98% by weight and y is from 2 to 20% by weight;
- R' and R" are the same or different, and are hydrogen or ($C_1$-$C_3$)-alkyl radicals;
- A is either —$CH_2CH_2$— or —$CH(CH_3)CH_2$—;
- $R_a$ is a linear or branched alkyl radical or a mixture of linear or branched alkyl radicals of from 8 to 30 carbon atoms;
- $R_b$ is a radical having the general formula (II):

wherein
R is a difunctional alkylene radical with general formula (III)

wherein
- n is either 0 or 1; and
- $R^1$-$R^6$ are the same or different, and are hydrogen or ($C_1$-$C_3$)-alkyl radicals, and wherein at least two of the four radicals $R^1$, $R^3$, $R^4$ and $R^6$ are ($C_1$-$C_3$)-alkyl radicals.

5. A concentrate for lubricating oils according to claim 4, wherein said dilutent is mineral oil.

6. A concentrate for lubricating oils according to claim 4, wherein said concentrate comprises 40-70% by weight of said additive.

7. A lubricating oil comprising:
(a) lubricating oil; and
(b) an effective amount for improving the viscosity index and modifying the friction of an additive with a general formula (I)

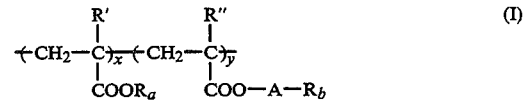

wherein said general formula (I) shows the type and amount of monomers, but not their arrangement in the end polymeric chain,
wherein
- x and y have the meaning of relative amount, x is from 80 to 98% by weight and y is from 2 to 20% by weight;
- R' and R" are the same or different, and are hydrogen or ($C_1$-$C_3$)-alkyl radicals;
- A is either —$CH_2CH_2$— or —$CH(CH_3)CH_2$—;
- $R_a$ is a linear or branched alkyl radical or a mixture of linear or branched alkyl radicals of from 8 to 30 carbon atoms;
- $R_b$ is a radical having the general formula (II):

wherein
R is a difunctional alkylene radical with general formula (III)

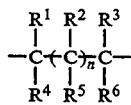 (III)

wherein n is either 0 or 1; and $R^1$–$R^6$ are the same or different, and are hydrogen or ($C_1$–$C_3$)-alkyl radicals, and wherein at least two of the four radicals $R^1$, $R^3$, $R^4$ and $R^6$ are ($C_1$–$C_3$)-alkyl radicals.

8. Lubricating oil composition according to claim 7, in which the viscosity index improver and friction modifier additive is present in an amount comprised within the range of from 0.5 to 10% by weight.

9. Lubricating oil composition according to claim 8, in which the viscosity index improver and friction modifier additive is present in an amount comprised within the range of from 1.2 to 6% by weight.

* * * * *